(No Model.) 10 Sheets—Sheet 1.

A. L. BLACKMAN.
CANAL LOCK.

No. 392,002. Patented Oct. 30, 1888.

Fig.1.

Witnesses.
Thomas Durant
Chas. R. Burr.

Inventor
Albert L. Blackman
by Church & Church,
his Attorneys.

(No Model.) 10 Sheets—Sheet 3.

A. L. BLACKMAN.
CANAL LOCK.

No. 392,002. Patented Oct. 30, 1888.

Fig. 3.

Witnesses
Thomas Durant
Chas. R. Burr.

Inventor.
Albert L. Blackman,
by Church & Church,
his Attorneys.

(No Model.)

A. L. BLACKMAN.
CANAL LOCK.

No. 392,002.    Patented Oct. 30, 1888.

(No Model.) 10 Sheets—Sheet 10.

A. L. BLACKMAN.
CANAL LOCK.

No. 392,002. Patented Oct. 30, 1888.

Witnesses.
Thomas Durant,
Chas. R. Burr.

Inventor.
Albert L. Blackman,
by Church & Church,
his Attorneys.

UNITED STATES PATENT OFFICE.

ALBERT LIVINGSTON BLACKMAN, OF NASHVILLE, TENNESSEE.

CANAL-LOCK.

SPECIFICATION forming part of Letters Patent No. 392,002, dated October 30, 1888.

Application filed January 19, 1888. Serial No. 261,283. (No model.) Patented in England December 9, 1887, No. 16,975; in France December 9, 1887, No. 187,492, and in Germany December 9, 1887, No. 8,179.

*To all whom it may concern:*

Be it known that I, ALBERT LIVINGSTON BLACKMAN, of Nashville, Tennessee, United States of America, have invented certain new and useful Improvements in Canal-Locks and in the Method of and Apparatus for Regulating the Same; and I do hereby declare that the following is a full, clear, and exact description of the same, applications for patents on said invention having been filed in England December 9, 1887, No. 16,975; in France December 9, 1887, No. 187,492, and in Germany December 9, 1887, No. B 8,179$^r$, and for which applications no patents have as yet been issued.

The improvements in canal-locks and in the method of and apparatus for regulating them which form the subject of the present invention relate to the method of filling and emptying the lock-basin, to the method of establishing communication between the lock-basin and a series of side terraces or tanks in which the water is collected for reuse as it leaves the basin, and to the construction and mode of operating the lock-gates.

The invention will be more readily understood by reference to the accompanying drawings, in which—

Fig. 2, a plan thereof, and Fig. 3 a vertical cross-section taken through line $a$ $b$ of Fig. 1, looking in the direction of the arrow. Fig. 3$^a$ is a plan showing alternative arrangement of pipes and conduits for filling the lock. Fig. 4$^a$ is a detail, in sectional plan, of the end of the recess in which the lower gate works, showing the manner of flushing the recess. Fig. 5$^a$ is a diagram showing alternative method of working gates. Fig. 11 is a section of upper lock-gate and sill thereof, showing the method of keeping the same free from silt and preventing it from wedging in its guides. Fig. 11$^a$ is a detail of top of gate, showing man-hole, and Fig. 12 a detail of buffer.

Figure 1:
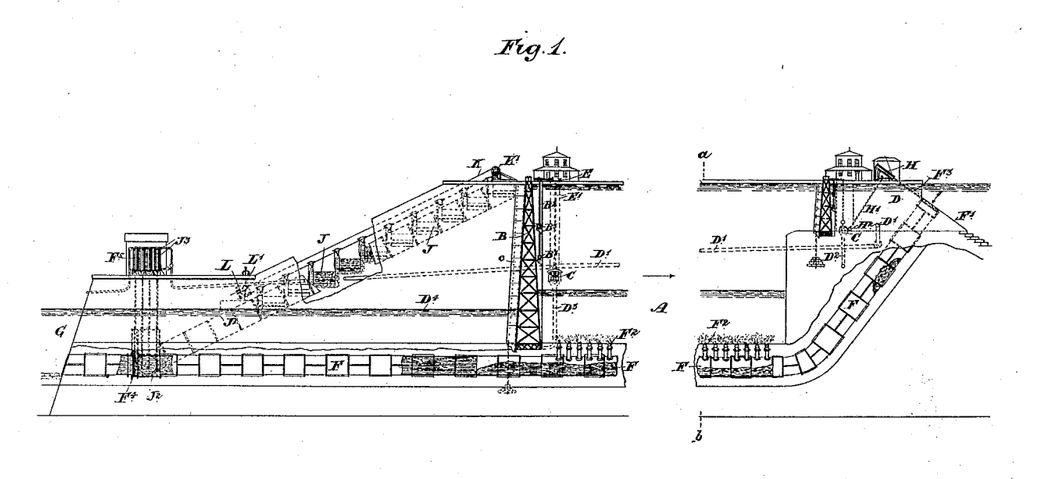
Figure 1 represents an elevation in longitudinal section of the principal features of my invention.
Figure 2:
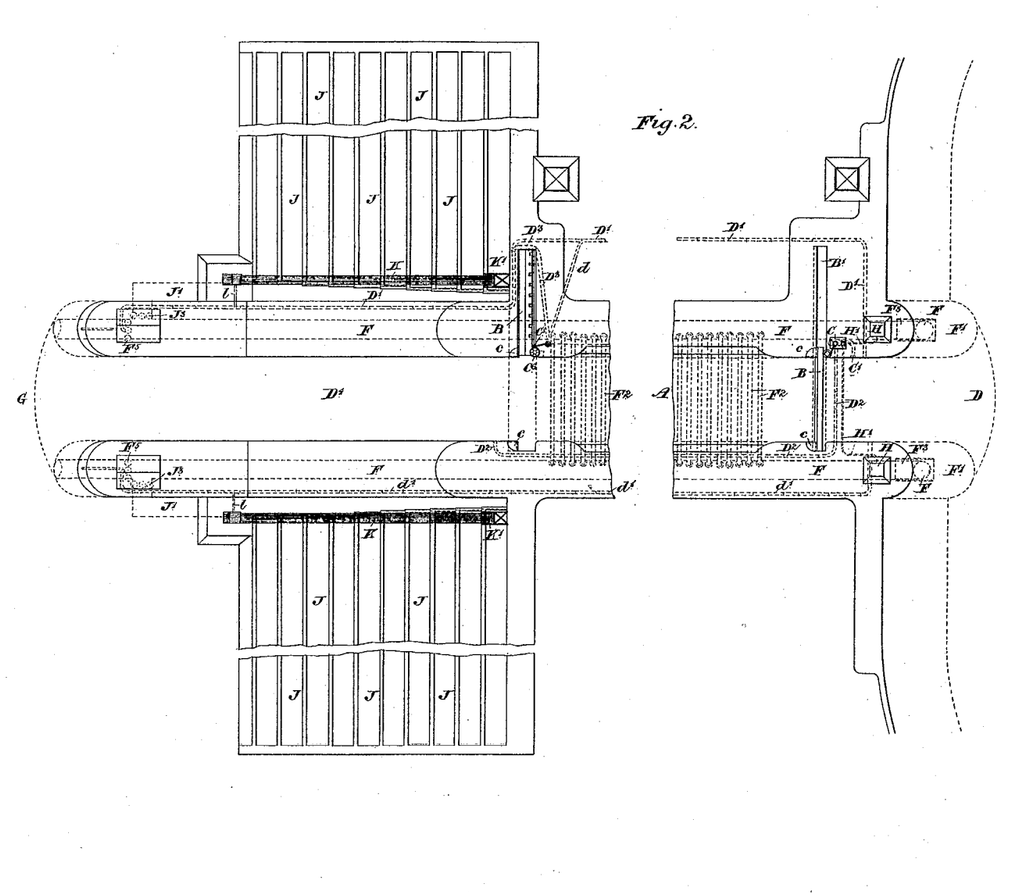

A is the basin of the lock, the central portion of which is broken away in Figs. 1 and 2. At the ends of the lock are provided the gates B, which resemble each other in construction and are in the form of caissons, the sides being inclined toward each other from the bottom upward. In the drawings, Fig. 2, the upper gate is closed and the lower one opened. The construction of the gate is such that when the water is at the normal level and equal on both sides of the gate it is nearly or quite sufficient to float or sustain the weight of the gate, whereby the power required to move it is reduced to that necessary to overcome friction and to effect the lateral displacement of the water. If, however, the water be higher on one side than the other the excess of pressure resulting therefrom directed against the inclined face will tend to force the gate downward and against the jambs $c$, and so make a tight joint.

Figure 4:
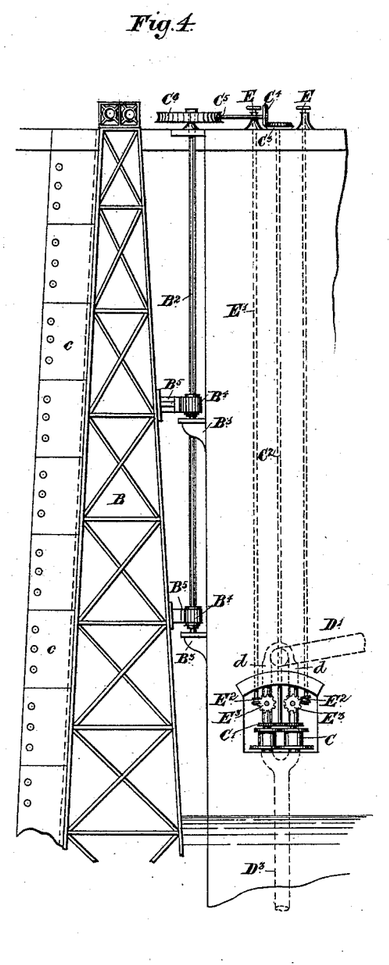
Fig. 4 is a detail in end elevation of the lower lock-gate, showing the method of working the same.
Figures 4, 10, 11, 12:
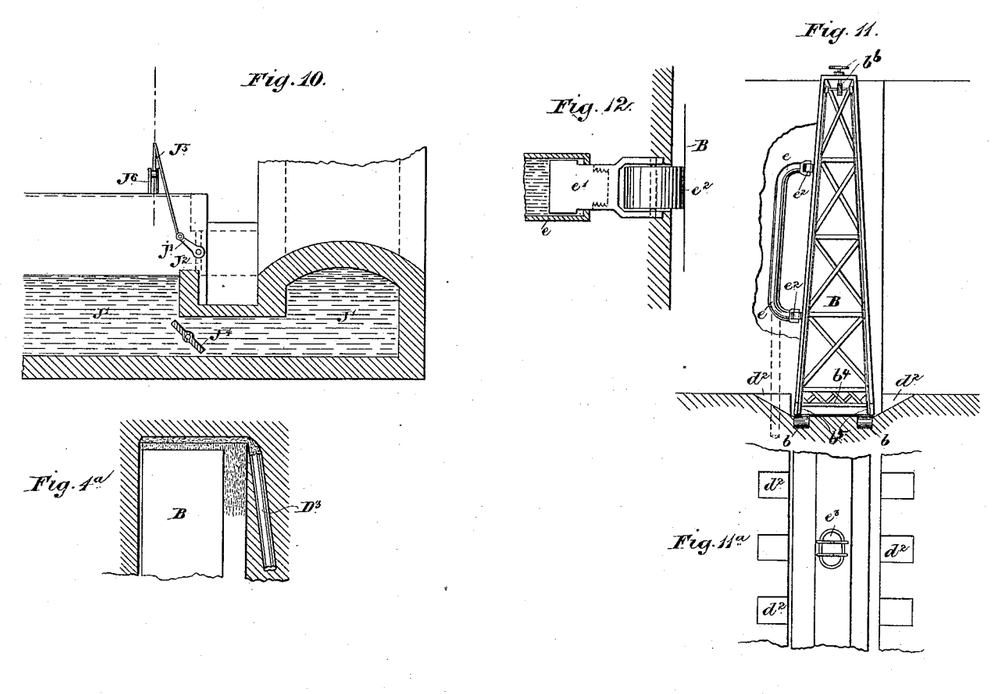

The gate is mounted on anti-friction rollers $b$, Fig. 11, and has a horizontal endwise movement at right angles to the direction of the canal, a recess, B', Fig. 2, being formed in the masonry to receive the gate when it is desired to open the passage through the lock.

Figure 3:
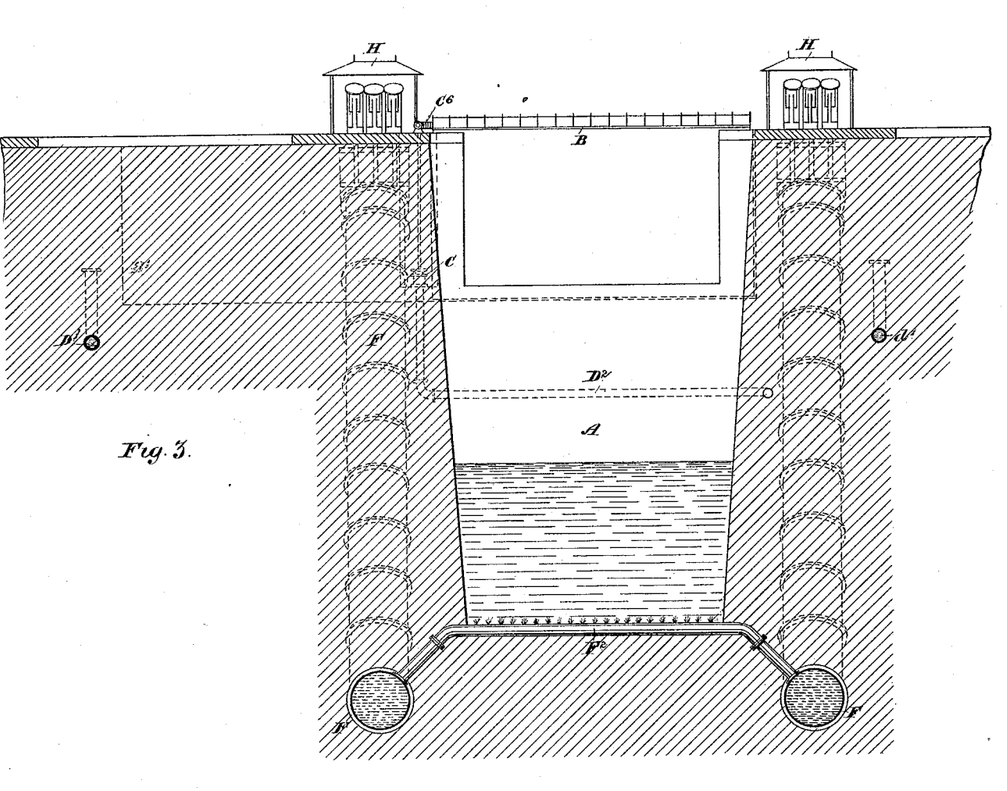
Figure 5:
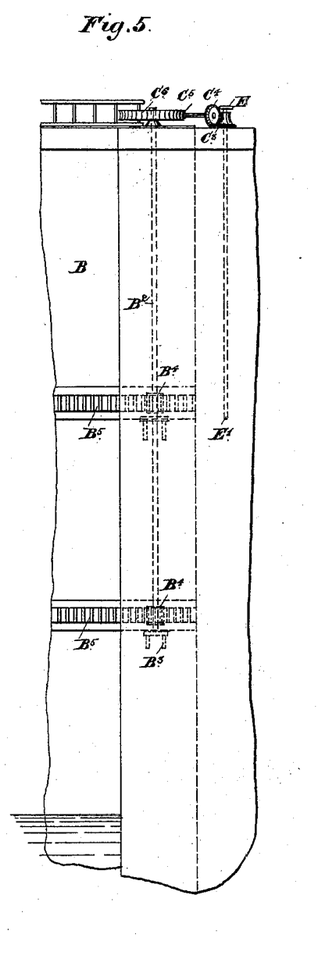
Fig. 5 is a side elevation of Fig. 4.
Figure 6:
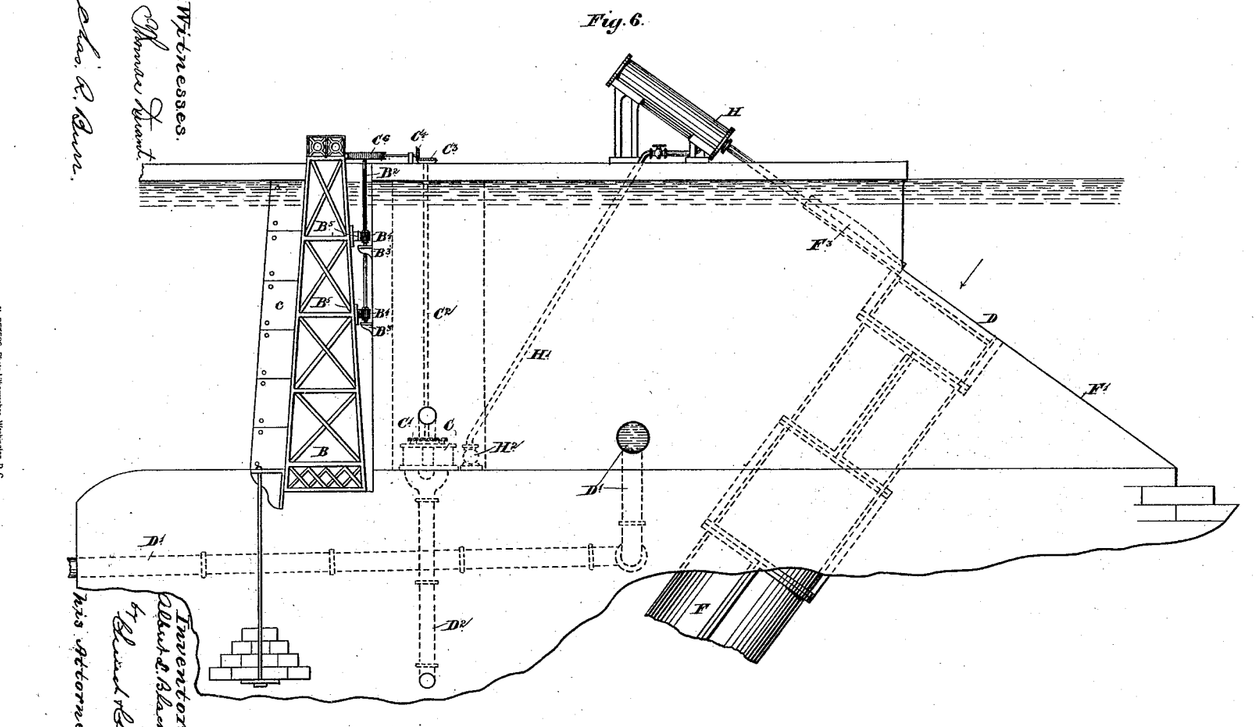
Fig. 6 is a detail, in longitudinal vertical section, of the lock about the upper gate, showing end of filling conduit and cylinders for opening the valve thereof.

The means employed for working the gates are shown on a larger scale in Figs. 4, 5, and 6, each gate being worked in the same manner by means of a turbine or pair of turbines, C, located in a chamber formed in the wall of the lock, the upper chamber being open at the top and the lower one open at the side. The turbines are so situated that the head of water contained in the upper level, D, at the higher section of the canal can be utilized for supplying the requisite motive power, the water passing to the upper turbine by the branch $c'$, Fig. 2, and to the lower one by a branch, $d$, from the pipe D'. (See Figs. 2, 3, and 4.)

D$^2$ and D$^3$, Fig. 2, are the discharge-pipes which conduct the water from the turbines to the lower reach, D', of the canal, the pipe D² delivering directly into the canal while the pipe D³ delivers into the farther end of the lower gate-chamber and flushes away the mud or sand, thereby keeping the bottom clean, Figs. 2, 4, and 4ª. The pipe D³ is bent round and extends across the gate-chamber from side to side, and is cut away or entirely open in front, so as to enable the water escaping to sweep the whole width of the chamber. This is clearly shown in the detail, Fig. 4ª.

The operation of the turbines is controlled by hand-wheels E, connected with shafts E', carrying worms E², which gear with worm-wheels E³ on the valve-stems, Figs. 4 and 5. The motion of the turbine is communicated to the lock-gate by toothed wheels C', which impart rotation to a vertical shaft, C², on the upper end of which is fixed a bevel-wheel, C³, gearing with another bevel-wheel, C⁴, on the shaft of which is a worm, C⁵, which gears with and imparts rotation to the worm-wheel C⁶. The latter is fixed on the top of a vertical shaft, B², which is mounted in wall-brackets B³, fixed to the side of the recess B', which contains the gate. On the shaft B² are two or more pinions, B⁴, which gear with an equal number of horizontal toothed racks, B⁵, fixed to the gate.

Figure 5A:
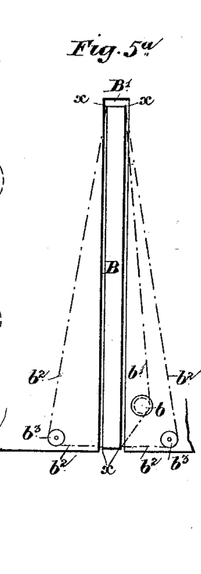

In Fig. 5ª I have shown a method of operating the gates whereby the racks, pinions, and worm and wheel for driving the latter may be dispensed with. In such case a capstan is mounted in or upon the wall, and around this is passed a chain, b', which is made fast to the gate at each end thereof. On the capstan being rotated by turbine—such as C, or other suitable means—the chain is taken up by the capstan on the one side and paid off on the other, thereby causing the gate to travel into or out of its recess according to the direction in which the capstan turns. To steady the gate during its passage across the lock, guide-chains b² are attached to the ends on each side thereof, the points of attachment being indicated by x. These guide-chains pass around rollers or pulleys b³, situated as near as possible to the edge of the wall some distance away from the gate. As the gate is traveling these chains acts as "guys" to steady the front portion or prevent it from swaying laterally under the action of the wind or water.

It is obvious that the tension upon the chains would vary with each movement of the gate if the guide-rollers b³ were simply cylinders revolving upon fixed axes. To keep the tension constant the guide-rollers may be made to move automatically nearer to or farther from the gate, or the rollers may be made with a double taper with helical grooves like a "double fusee," so that the paying out and taking up of the chains could be made to vary at a predetermined rate.

To ease the lock-gate—which when closed would be firmly pressed against the side of the recess by the pressure of water due to the higher level on one side of the gate and rendered immovable thereby—two or more hydraulic cylinders or water-buffers, e, Figs. 11 and 12, are fixed inside the recess near the outer edge, the plungers e' of which are provided with anti-friction rollers e², which bear against the gate. Water is admitted to the cylinders from the upper reach under heavy pressure which may be obtained by means of pumps driven by the turbines or in some other convenient manner, and the pressure thereof, acting against the plungers e', releases the gate from contact with the sides of the recess, thereby leaving it free to move, or the rollers may be mounted upon the gate and bear upon plates or rails fixed to the walls of the recess. To prevent accumulation of silt near the bottom of the upper lock-gates, B, or in the channels in which the gates move, a number of small sloping channels, d², Figs. 11 and 11ª, are formed in the sides of the channels on each side of the gates.

The gate itself is formed with a false bottom, b⁴, and with doors b⁵, inclosing the space between the false bottom and the actual bottom, which can be raised and lowered by means of a suitable arrangement of levers and mechanism, b⁶, so as to leave a clear way through the gate for the passage of the silt when it is desired to flush the same through. If there is room, this flushing may take place underneath the gate B instead of through it, means—such as the doors b⁵—being provided to close the passage when not required for use.

Man-holes with covers e³ are provided in the top of the gate to afford access to the interior for cleaning or repairs.

Figure 7:
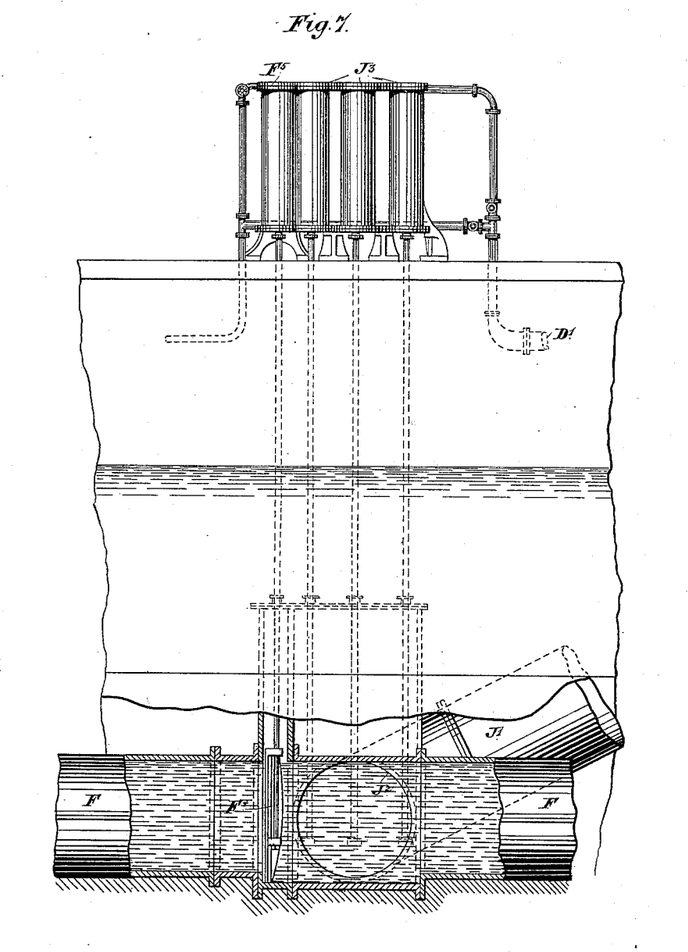
Fig. 7 shows detail of valves controlling the outlet from lock and cylinders for operating said valves.

The lock is filled by means of side conduits, F, Figs. 2 and 3, which are laid in the masonry and open into the upper reach, D, flush with the sloping wall F', and terminate in a similar manner in the lower reach, G. Within the lock the conduits are connected by pipes F², the upper sides of which are perforated and level, or about level, with the floor of the lock. As the water in the lock can never sink below the level of the lower reach, there is always a layer of water many feet in depth between the orifices in the pipes F² and the surface of the water. This layer acts as a cushion against the water issuing from the pipes F², which would otherwise issue in jets rising nearly to the height of the water in the upper reach. The upper ends of the conduits F are closed by sliding sluice-valves F³, (see detail, Fig. 6,) which are operated by the hydraulic cylinders H, supplied with water through the pipes H' by means of the pump H², which is located in the same chamber as the upper turbine, C, by which it is driven. The outlets from the conduits F are controlled by valves F⁴, Figs. 1 and 7, operated by the two series of cylinders F⁵, which are supplied with water from the upper reach by the pipes D' and d'. In order to reduce the power necessary to work the various valves which are subjected to great pressure—as, for instance, the valves F³, F⁴, and J²—they may be provided with anti-friction or hydraulic relieving-rollers. A somewhat different arrangement of the pipes for filling the lock is shown in Fig. 3ª. The main conduits F, instead of being carried parallel to the sides of the lock and connected by cross-pipes, are connected together by a transverse conduit, F⁶, at each end of the lock, and these transverse conduits are connected by a series of longitudinal pipes, F⁷, laid parallel with the sides of the lock and perforated similarly to the pipes F², previously described.

On each side of the lower reach of the canal is formed a series of tanks or terraces, J, for containing water. These tanks are arranged *en echelon* or staircase fashion, ascending by regular steps, so that the top water-line of one tank is about level with the bottom of the next above it of the series. The whole of the tanks or terraces in each series communicate with an inclined conduit, J', which communicates with the conduit F on the same side of the canal, the communication being opened or cut off by a valve, J², which is operated by the hydraulic cylinders J³, the two series of which are supplied with water by the pipes D' and d', respectively. There are preferably three of these cylinders J³ to each of the valves J², and three cylinders, F⁵, to each of the valves F⁴. The conduit J' may be formed of iron pipes similarly to the conduit F, as shown in Fig. 1, or it may be built in the masonry, as shown in Fig. 10.

Figure 8:
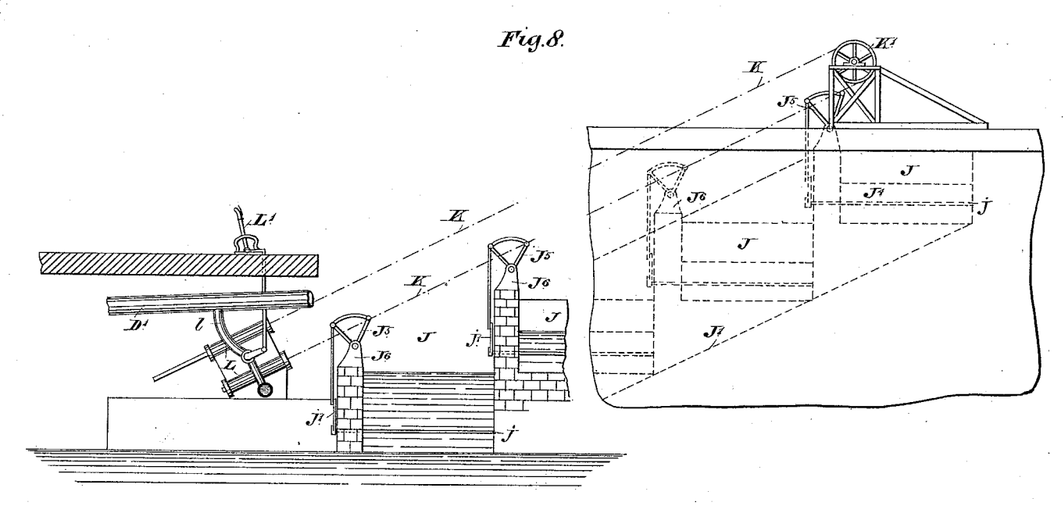
Fig. 8 is a detail, in elevation, of side tanks and apparatus for controlling same.

In the end of each terrace where it communicates with the conduit J' is a valve, J⁴, (see Figs. 8, 9, and 10,) which works on a horizontal rod or axis, j, on the end of which is a lever, j', which is connected by a link to one arm of a bell-crank lever, J⁵, which is fulcrumed on a pedestal-bracket, J⁶, which rests on the wall of the tank. The other arm of the bell-crank lever is connected to a chain or equivalent, K, which passes around a guide-pulley, K', mounted in bearings on the embankment, and each end of which is connected to the piston-rod of a hydraulic cylinder, L, a series of which are arranged in pairs one over the other, at a suitable incline and distance apart, as shown in detail in Figs. 8 and 9. L' is a lever with quadrant for regulating the admission of water to the cylinders which work in opposite directions, one piston hauling in one end of the chain K and the other paying it out, and vice versa, according as it may be desired to open or close the valves J⁴. The water for supplying the cylinders L is carried from the pipes D' d' by means of the branch pipes l, Figs. 2 and 9.

Figure 9:
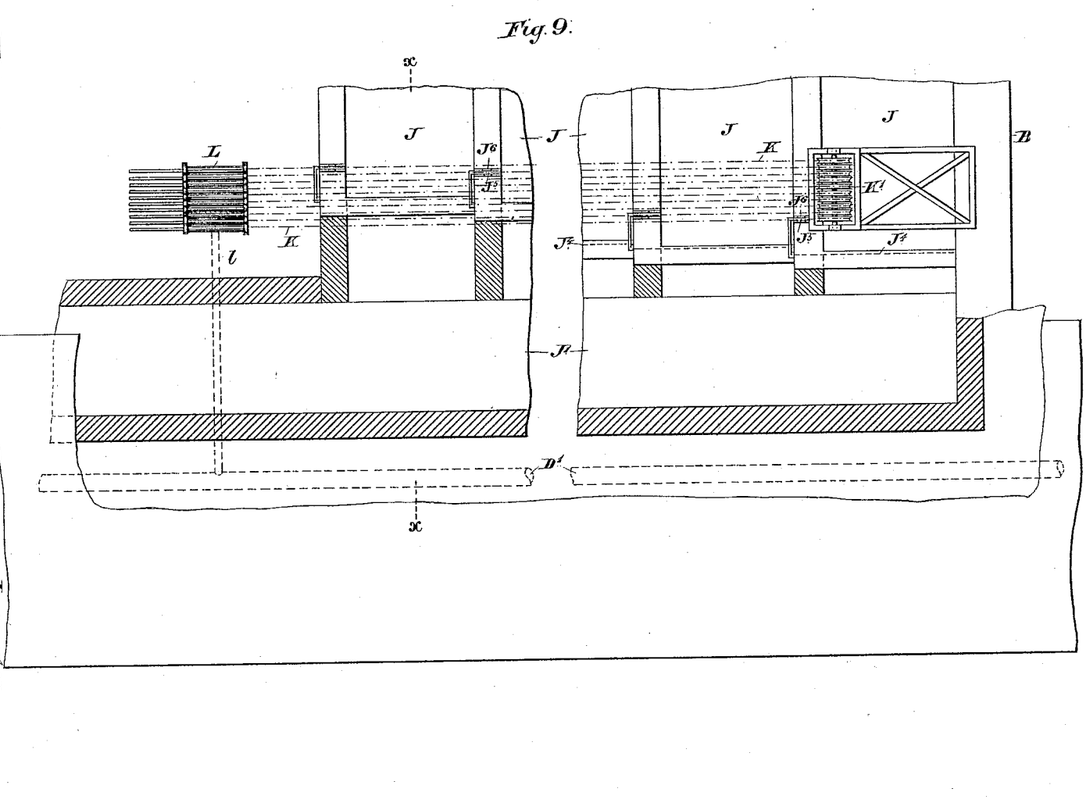
Fig. 9 is a plan thereof, and Fig. 10 a section through line $xx$ on Fig. 9.

Each terrace is provided with its own cylinders L, chain K, guide-pulley K', and regulating-lever L', and in order to admit of these parts being arranged in parallel series the terraces are shortened, each one from the topmost downward being slightly shorter than the one preceding it, as shown in Figs. 2 and 9; or the valves J⁴ may be set back or otherwise arranged so as to effect the same result.

The mode of working the lock is as follows: Supposing the water in the lock to be level with that in the lower reach, G—that is, at the lowest working-level—and it is desired to let down a boat from the higher reach, the valves F³ at the conduit-inlets F in the upper reach, D, are opened, and the valves F⁴ at the conduit-outlets in the lower reach being closed the water flowing down the conduits will pass into the lock through the perforated pipes F² (see Figs. 1, 2, and 3) until the water reaches the level of the upper reach, both gates B being closed. The conduit-inlets are then closed by the valves F³, operated by the cylinders H, Fig. 6, as already explained, and the upper gate, B, opened by letting water into the turbine C, as already explained, for the passage of the boat into the lock, after which it is closed again. Water is then admitted through the pipe D' to the cylinders J³ for the purpose of opening the valve J². The valves J⁴ controlling the top terraces or tanks on each side of the canal are also opened, when the water will commence to flow out from the lock, through the perforated pipes F² and conduit F, up the inclined conduit J' and into the top terraces, J, until it reaches approximately the same level in both the top terraces and lock. The valves controlling the top terraces are then closed and those next below opened, and so on until all the terraces are filled, when the water in the lock will have reached approximately the level of the water in the lowest terrace. The level of the water in the lock is still higher than that in the lower reach, D⁴, and this is got rid of by opening the valve F⁴, (after the valve J² has been closed,) and allowing it to flow into the lower reach; or this may be accomplished by raising the doors b² at the bottom of the gate. The excess-water in the lock having been thus got rid of the lower gate, B, can be opened for the passage of the boat.

When it is desired to lift a boat from the lower to the higher level, the boat is admitted to the lock and the lower gate, B, closed. The top gate, B, is of course always closed except while a boat is passing. The valve F⁴ is also closed and the valves J² opened. The valves controlling the terraces or tanks are then opened in succession, commencing with the lowest tanks and proceeding upward, the valve J⁴ of each being closed as soon as the tank is emptied. The water thus released will flow back into the lock through the conduits J' and F and perforated pipes F², and when the flow ceases the level in the lock will be nearly equal with that in the upper reach, D, and this deficiency will be made up by admitting water from the higher reach, D, through the conduits F, the valves F³ being opened for this purpose and then closed again. The upper gate, B, is then opened, the boat passed into the upper reach, D, and the upper gate again closed.

I claim—

1. The combination, with a canal lock, of two conduits, such as F, one at each side of the lock, connected by perforated pipes, such as F², and having their openings into the upper and lower reaches of the canal controlled by valves, substantially in the manner and for the purpose described, and illustrated in the accompanying drawings.

2. The combination, with a canal-lock, of one or more conduits, such as F, at the side or sides of the lock, connected with perforated pipes, such as F², and having their openings into the upper and lower reaches of the canal controlled by valves, substantially in the manner and for the purpose described, and illustrated in the accompanying drawings.

3. The combination, with conduits, perforated cross pipes connecting the same, and valves for closing the ends of the conduits, of hydraulic cylinders for operating the valves, substantially as described.

4. The combination, with conduits, valves for closing the same, and hydraulic cylinders for closing the valves, of a hydraulic pump operated by the upper turbine for operating the valve-opening cylinders belonging thereto, substantially as described.

5. The combination, with a canal-lock, of two series of tanks, such as J, arranged in terraces rising one above the other, each tank controlled by an independent valve or sluice communicating with the conduit J', itself controlled by the valve J², the communication between lock and tanks being by a series of perforated pipes, such as F², the whole constructed and operating substantially in the manner described, and illustrated in the accompanying drawings.

6. In a canal-lock, the combination, with the recess B', into which the lock-gate slides, of a pipe or conduit, such as D³, extending across and opening into the end of the said recess for the purpose of flushing out the recess and clearing it of silt, substantially as described, and shown in the accompanying drawings.

7. The means for clearing out the silt from the channels in which the gate B slides, consisting of small channels, such as $d^2$, in the sides of the main channels, and doors, such as $b^2$, in the bottom of the sides of the gates B, whereby when the said doors $b^2$ are opened the water will pass by the channels $d^2$ and doors $b^2$ through or under the gates B and remove the silt, substantially as described, and illustrated in the accompanying drawings.

8. A lock-gate in the form of a caisson with sides sloping toward each other from the bottom upward, arranged to move horizontally across the lock and worked by pinions gearing with racks placed horizontally across the gate, substantially as described.

9. The combination, with the lock-gate constructed in the form of a caisson and the walls for normally supporting said gate, of water-buffers, substantially such as described, projected by a water-column while the gate is being operated to constitute the lateral support for said gate at such time, as set forth.

10. The combination, with the lock-gate constructed in the form of a caisson and the walls for normally supporting said gate laterally, of water-buffers provided with anti-friction rollers, substantially such as described, projected by a water-column while the gate is being operated to constitute the lateral support for said gate at such time, as set forth.

11. The combination, with a lock-gate constructed to move horizontally under the influence of racks and pinions, of a turbine or other suitable power placed below the level of the water in the upper reach and driven therefrom and imparting motion to a vertical shaft, bevel-wheels, and a worm and worm-wheel, substantially as described.

12. The combination, with a canal lock, of side filling and emptying conduits connected by perforated cross-pipes and side tanks or terraces for storing the water as it leaves the lock for future use, substantially as described.

13. In combination with a canal-lock, a series of tanks arranged one above another, a horizontal filling and emptying conduit, an inclined conduit connected with the horizontal-filling conduit, a series of independent valves between the inclined conduit, and the series of tanks and other valves for controlling the admission and discharge of water into and from said inclined conduit, substantially as described.

14. In combination with water saving tanks, the valves for controlling the communication between the tanks and the inclined conduits, and the bell-crank levers, guide-pulleys, chains, and hydraulic cylinders for operating the said valves, all substantially as and for the purpose described.

15. The combination, with the turbines and their supply-pipe leading from the upper reach, of the pump H², operated by the turbines, the hydraulic cylinder H, in communication with said pump, and the valve F³, operated by said hydraulic cylinder to open and close the supply-conduit, substantially as described.

16. The combination, with the turbines and their supply-pipe leading from the upper reach, of the laterally-movable lock-gate having the racks, the gears engaging said racks, the shaft on which they are mounted, and the connecting-gear between said shaft and the shaft driven by the turbines, substantially as described.

17. A system of apparatus for regulating canal-locks, comprising conduits extending from the higher to the lower reach of the canal, such conduits being connected by perforated cross-pipes opening into the lock-valves operated by hydraulic cylinders for controlling the flow of water into or out of the lock, floating lock-gates worked by turbines, and side tanks or terraces with valves worked by hydraulic cylinders, the whole operating substantially as and for the purpose described.

18. The combination, with a lock-gate provided with means for passing the water through or under it, of channels $d^2$, formed in the lock-bottom at each side of the channel in which the gate works, substantially as and for the purpose specified.

In testimony whereof I have hereunto set my hand in the presence of the two subscribing witnesses.

ALBERT LIVINGSTON BLACKMAN.

Witnesses:
G. W. WESTLEY,
ARTHUR R. SKERTEN,
  Both of 17 Gracechurch Street, London.